Feb. 15, 1966 M. H. GROVE 3,235,224
VALVE SEAL CONSTRUCTION
Filed Aug. 27, 1963
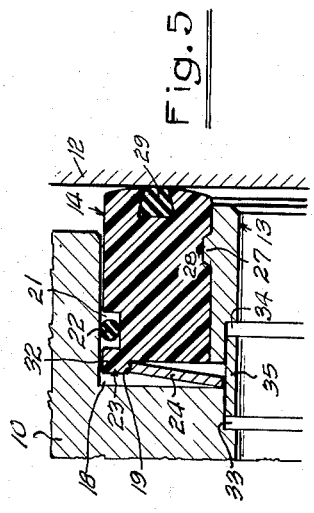
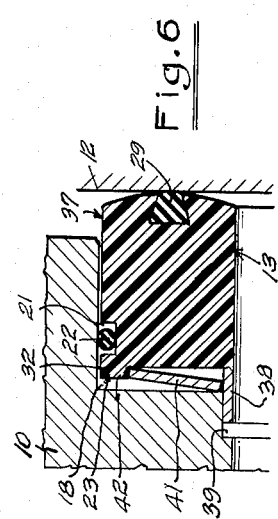
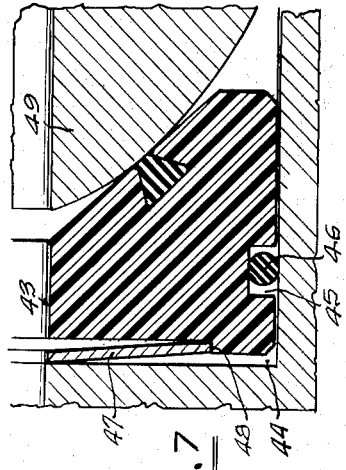
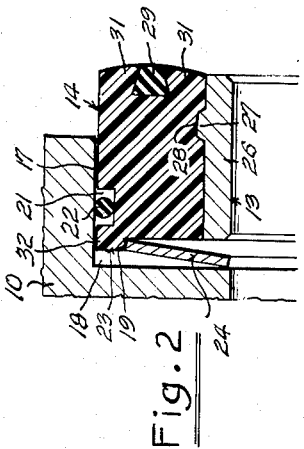
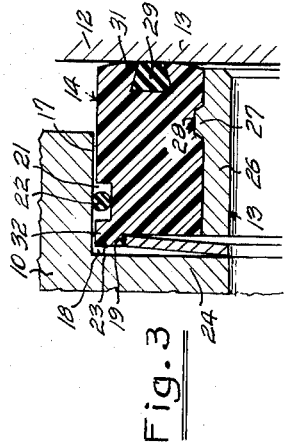
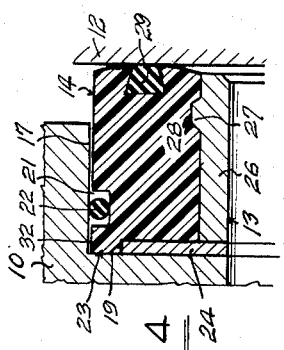
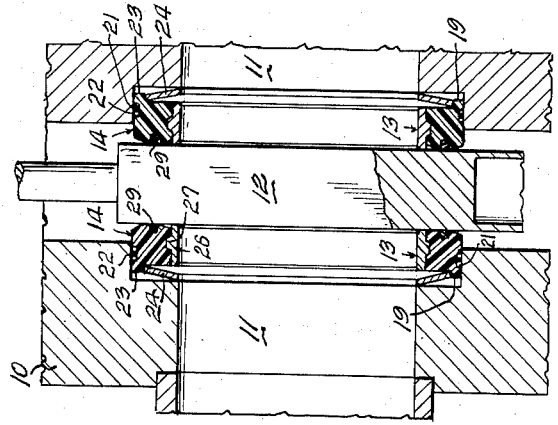
INVENTOR.
MARVIN H. GROVE.
BY
Flehr and Swain
ATTORNEYS.

United States Patent Office 3,235,224
Patented Feb. 15, 1966

3,235,224
VALVE SEAL CONSTRUCTION
Marvin H. Grove, 340 Hillside Ave., Piedmont, Calif.
Filed Aug. 27, 1963, Ser. No. 304,879
1 Claim. (Cl. 251—174)

This invention relates generally to valves of the type used for controlling flow of various fluids.

In the construction of valves of the gate or ball types, it is common practice to utilize seal rings to establish fluid-tight seals between the valve body and the inner movable valve part. In some instances a single seal ring may be employed upon either the upstream or downstream side, but in most instances such rings are located upon both the upstream and downstream sides. As shown particularly in my applications Ser. No. 190,174, filed April 25, 1962, now Patent No. 3,166,291, and Ser. No. 221,997, filed September 7, 1962, now Patent No. 3,121,553, the seal rings may be an annular member made of resilient material like nylon, with free-floating action. In one typical embodiment disclosed in said applications, the resilient seal member has a groove or recess about its periphery to accommodate a seal ring of the O-ring type, which establishes sealing relation between the seal member and one of the valve parts. One problem in the construction of such sealing assemblies is to avoid distortion of any part of the resilient seal members, under operating pressures. Particularly, if the seal member is provided with an O-ring retaining recess near its inner end, distortion if permitted to occur may interfere with maintenance of a seal between the seal member and the corresponding body part. This problem is accentuated for the smaller size valves where there are dimensional limitations to the size of the parts.

An object of the present invention is to provide a novel valve construction utilizing an annular seal member made of resilient material like nylon, together with novel means for reinforcing this seal member against detrimental distortion.

Another object of the invention is to provide a valve construction of the above character having a novel sealing assembly in which spring means serves the dual function of urging an annular resilient seal member against a valve working surface, and reinforcing this member against distortion.

Another object of the invention is to provide a novel seal assembly for valves utilizing spring means of the Belleville type for urging an annular resilient seal member into sealing relationship with an adjacent valve part.

Additional objects and features of the invention will appear from the following description in which the preferred embodiments have been set forth in detail in conjunction wth the accompanying drawing.

Referring to the drawing:

FIGURE 1 is a side elevational view in section illustrating the essential portions of a simple gate valve;

FIGURE 2 is a detail in section on an enlarged scale showing the sealing means incorporated in FIGURE 1;

FIGURE 3 is a view like FIGURE 2, but showing the annular seal member engaged with the valve gate;

FIGURE 4 is a view like FIGURE 2, but illustrating the position of the seal member upon the downstream side of the valve, when the line pressure is being applied and the seal member is receiving the thrust of the valve member;

FIGURE 5 is a cross-sectional detail like FIGURE 2 but showing another embodiment utilizing a sediment guard;

FIGURE 6 is an enlarged detail in section like FIGURE 2 showing a further embodiment in which a sediment guard is incorporated; and FIGURE 7 is a detail in section illustrating another embodiment suitable for use with valves of the ball type.

The simple valve shown in FIGURE 1 consists of a body 10 having aligned flow passages 11 and the movable valve gate 12. The assemblies 13 are interposed between the body and the gate and comprise sealing means upon both the upstream and downstream sides.

As shown particularly in FIGURES 2–4, the sealing means in this instance consists of an annular sealing member 14 formed of a suitable resilient material like nylon. The outer peripheral surface of this member is substantially cylindrical, and is slidably fitted within the cylindrical bore 17 formed in the valve body. The bore 17 is the outer periphery of a body recess 18, that is also defined by the bottom surface 19.

An annular groove or recess 21 is formed in the outer periphery of the seal member 14 and serves to accommodate the resilient O-ring 22. This serves to form a fluid-tight seal between the seal member and the body. The inner end of the seal member 14 is formed to provide the annular shoulder 23, which embraces the outer peripheral edge of a spring washer 24 of the Belleville type.

Depending upon the operating pressure range for which the valve is designed, the seal member 14 can be fitted upon a carrier ring 26. This ring is made of suitable metal, and it may be provided with a rib 27 which interfits a groove 28 formed on the inner periphery of the member 14.

Generally it is desirable to provide the outer end of the seal member 14 with an insert 29 of material which is somewhat softer than the material from which the member 14 is made. For example, assuming that the member 14 is made of a material like nylon, the insert 29 can be made of a somewhat softer material such as a synthetic rubber or elastomer like Hycar or Viton. As disclosed in my copending application Serial No. 253,416, filed January 23, 1963, it is desirable for the insert 29 to be generally triangular or delta shaped. When this type of composite sealing member is pressed against an adjacent valve working surface, the portions 31 tend to flex, thus squeezing the insert and urging its exposed surface into sealing contact with the adjacent valve working surface.

At the time the seal member 14 is assembled with the Belleville washer 24, and also the carrier ring 26 (where this is employed), it is desirable to provide some degree of prestressing. Thus in practice I have immersed the nylon member 14 in boiling water for a sufficient period of time to cause it to expand somewhat and to become softer and more flexible. While in such condition, the shoulder 23 is fitted over the outer peripheral edge of the Belleville 24, the dimensions being such that after the nylon has cooled, shrinkage establishes tight interfitting relationship between the shoulder 23 and the Belleville washer, with some prestressing of both the washer and the adjacent portions of the nylon. Also while the nylon member 14 is at an elevated temperature, it can be pressed over the carrier ring 26, whereby after member 14 has cooled, it has a shrink fit upon the carrier.

FIGURE 2 represents the positioning of the parts when first assembled within the valve, but without contact with a valve gate. When the valve gate is introduced between the two assemblies 13, both assemblies are somewhat compressed to the positions shown in FIGURE 3. Assuming that the valve is closed and line pressure applied, and that the downstream assembly takes the thrust of the valve gate, then the downstream assembly assumes the position shown in FIGURE 4. Note that in FIGURE 4 the inner end of the seal member 14 bottoms upon the surface 19.

For all operating positions of the parts under applied differential pressures, the nylon seal member 14 is subjected to forces tending to cause distortion. This is particularly true of that portion 32 which extends between the shoulder 23 and the O-ring retaining recess 21. However, because of the interfitting relationship between the outer peripheral edge of the Belleville washer and the shoulder 23, the portion 32 is reinforced against distortion and thus maintains its desired form. At the same time, because of the prestressing, the Belleville remains attached to the seal member 14. If under conditions of fire, the seal member becomes fused or charred, the carrier ring 26 will maintain an approximate secondary seal.

In the embodiment of the invention shown in FIGURE 5, the parts are the same as in FIGURES 2–4, except that a sediment guard is provided. Thus recesses 33 and 34 are machined in the body and the carrier ring 26 respectively, and these recesses serve to loosely accommodate the split sediment guard ring 35.

In the embodiment shown in FIGURE 6, the carrier ring 26 is omitted. The seal member 37 is made somewhat heavier in its dimensioning and is provided with an annular extension 38 which is slidably accommodated within the annular recess 39 formed in the valve body. Belleville spring 41 in this instance is likewise included within the annular shoulder 42 formed on the seal member 37.

FIGURE 7 shows a suitable construction for valves of the ball type. In this instance the annular seal member 43 is made of a suitable resilient material like nylon, and it is fitted within the body recess 44. Its outer periphery is provided with a groove or recess 45 to accommodate the O-ring 46. The Belleville spring washer 47 has its outer peripheral edge interfitting the annular shoulder 48 on the member 43. The exterior face of the seal member 43 is formed to engage and seal with respect to the rotatable valve ball 49. Here again the Belleville washer applies thrust to the seal member. It serves to support the adjacent portions of the seal members, and it is assembled with prestressing whereby it is attached to the seal member.

In general it will be evident from the foregoing that my valve construction provides an effective but relatively simple sealing means, and permits use of resilient materials like nylon. The seal is adequately protected against distortion of the nylon or other resilient material.

I claim:

In a valve construction, a body part having flow passages, a valve part within the body part and movable between open and closed positions, an annular seal member surrounding one of said flow passages and formed of resilient non-metallic material, a recess formed in one of said parts and in which the seal member is movably fitted, the recess having a substantially cylindrical peripheral surface in close proximity with the outer periphery of the seal member and also having a bottom surface, fluid pressure sealing means between the outer periphery of the seal member and said peripheral surface, said seal member having that end of the same exterior of said recess in sealing contact with the valve working surface on the other part and a spring washer of the Belleville type interposed between the other end of the seal member and said bottom surface of the recess, the outer periphery of said washer having interfitting engagement within and serving to support an adjacent annular shoulder formed by an annular portion of the seal member, said annular portion being formed on said other end of the seal member, said sealing means being of the O-ring type and comprising an annular retaining recess formed in the outer periphery of the seal member near said other end of the same, and a resilient O-ring within the recess, said annular portion forming one side of said recess.

References Cited by the Examiner

UNITED STATES PATENTS

| | | | |
|---|---|---|---|
| 293,329 | 2/1884 | Jenkins | 251—328 |
| 1,488,296 | 3/1924 | Stevens | 251—174 |
| 2,908,480 | 10/1959 | Hamer | 251—328 |
| 3,091,428 | 5/1963 | Magos | 251—174 X |
| 3,135,285 | 6/1964 | Volpin | 251—174 X |

FOREIGN PATENTS

| | | |
|---|---|---|
| 1,172,080 | 10/1958 | France. |
| 917,131 | 1/1963 | Great Britain. |

ISADOR WEIL, *Primary Examiner.*

M. CARY NELSON, *Examiner.*